(12) United States Patent
Perry

(10) Patent No.: US 6,896,140 B1
(45) Date of Patent: May 24, 2005

(54) CRUSH PROOF CUPCAKE HOLDER

(76) Inventor: Ramsey Perry, 2103 Beldon Ct., Plainfield, IL (US) 60544

( * ) Notice: Subject to any disclaimer, the term of this patent is extended or adjusted under 35 U.S.C. 154(b) by 85 days.

(21) Appl. No.: 10/436,476

(22) Filed: May 12, 2003

(51) Int. Cl.⁷ ............................................. A45C 11/20
(52) U.S. Cl. ..................... 206/551; 206/804; 206/817; 206/754; 206/755; 229/906
(58) Field of Search ................................. 206/551, 521, 206/751, 754, 755, 776, 804, 817; 229/906, 902; 220/528, 735; 426/106, 115, 124, 128

(56) References Cited

U.S. PATENT DOCUMENTS

| | | | |
|---|---|---|---|
| 1,939,342 A | * 12/1933 | Edwards | ..................... 206/493 |
| D218,155 S | 7/1970 | Britt | |
| 4,179,040 A | * 12/1979 | Bateman et al. | ............. 220/796 |
| 5,082,677 A | * 1/1992 | Bear | ........................... 426/124 |
| 5,269,430 A | * 12/1993 | Schlaupitz et al. | ......... 220/4.23 |
| 6,003,671 A | 12/1999 | Mc Donough et al. | |
| 6,146,673 A | 11/2000 | Ferguson | |
| 6,176,375 B1 | * 1/2001 | Truscello et al. | ........... 206/776 |

FOREIGN PATENT DOCUMENTS

JP            4-367451       * 12/1992

* cited by examiner

Primary Examiner—David T. Fidei

(57) ABSTRACT

A crush proof cupcake holder for transporting a single pastry without crushing and includes a main container assembly with a bottom wall and a perimeter wall extending upwardly from a perimeter edge of the bottom wall, the main container assembly defines an interior space which is used for selectively receiving a pastry; and a lid assembly operationally couplable to the main container assembly for selectively inhibiting access to the interior space.

9 Claims, 3 Drawing Sheets

US 6,896,140 B1

CRUSH PROOF CUPCAKE HOLDER

BACKGROUND OF THE INVENTION

1. Field of the Invention

The present invention relates to food containers and more particularly pertains to a new crush proof cupcake holder for PURPOSE.

2. Description of the Prior Art

The use of food containers is known in the prior art. U.S. Pat. No. 6,003,671 describes a device for storing multiple cupcakes and includes a lid, but does not facilitate lifting out the pastries, nor inhibit vertical movement. Another type of food containers is U.S. Pat. No. 6,146,673 having a multiple trays positionable within a larger container.

While these devices fulfill their respective, particular objectives and requirements, the need remains for a system that allows transport of a single pastry without crushing of losing frosting due to sticking to the container.

SUMMARY OF THE INVENTION

The present invention meets the needs presented above by providing a crush resistant container and lid, which hold the pastry in a static position relative to an interior of the container.

Still yet another object of the present invention is to provide a new crush proof cupcake holder that lifts the pastry out of the container when opened.

Even still another object of the present invention is to provide a new crush proof cupcake holder that prevents the pastry from sliding side-to-side within the container.

To this end, the present invention generally comprises a main container assembly with a bottom wall and a perimeter wall extending upwardly from a perimeter edge of the bottom wall, the main container assembly defines an interior space which is used for selectively receiving a pastry; and a lid assembly operationally couplable to the main container assembly for selectively inhibiting access to the interior space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
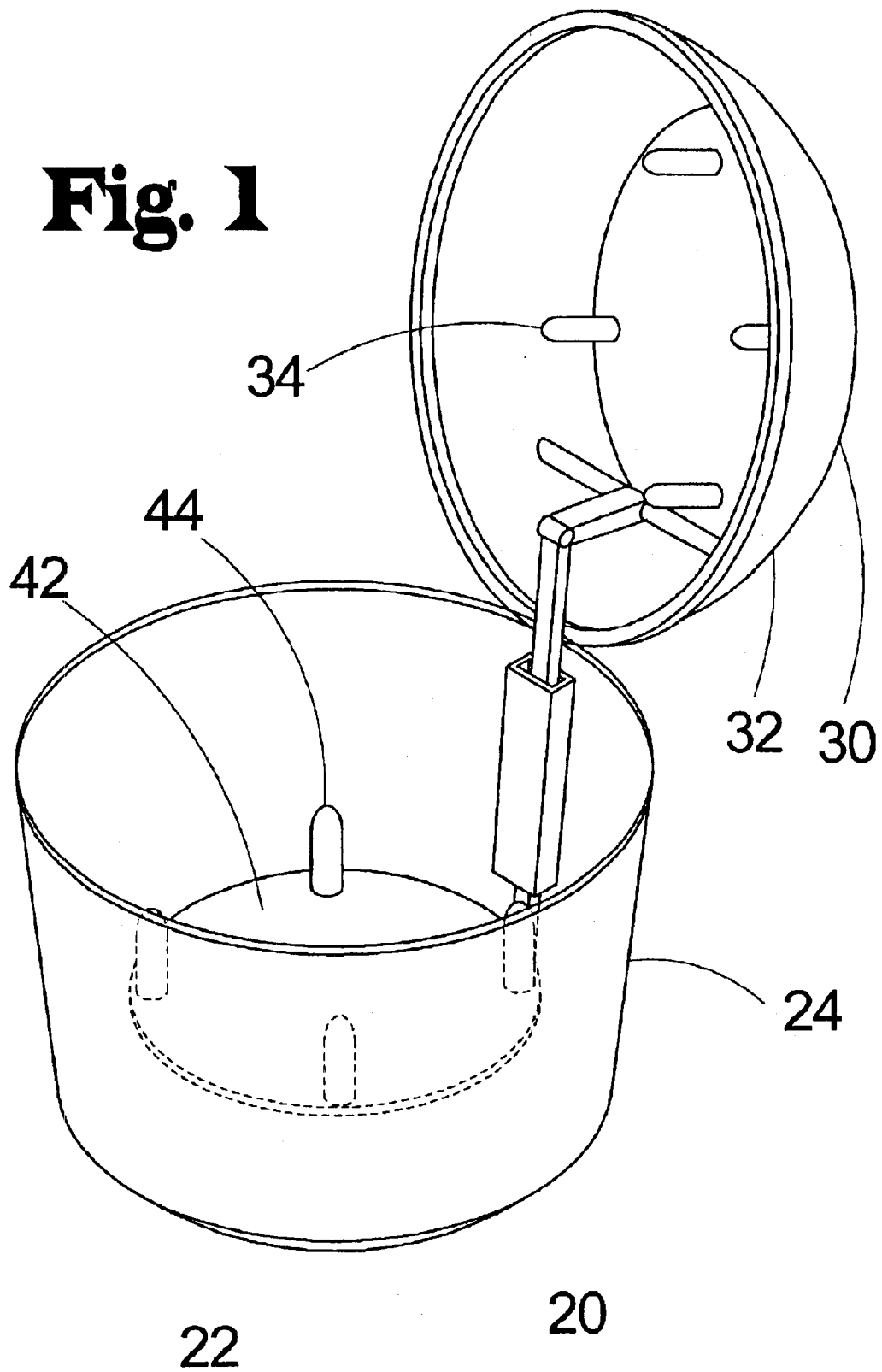
FIG. 1 is a schematic perspective view of a new crush proof cupcake holder according to the present invention.
Figure 2:
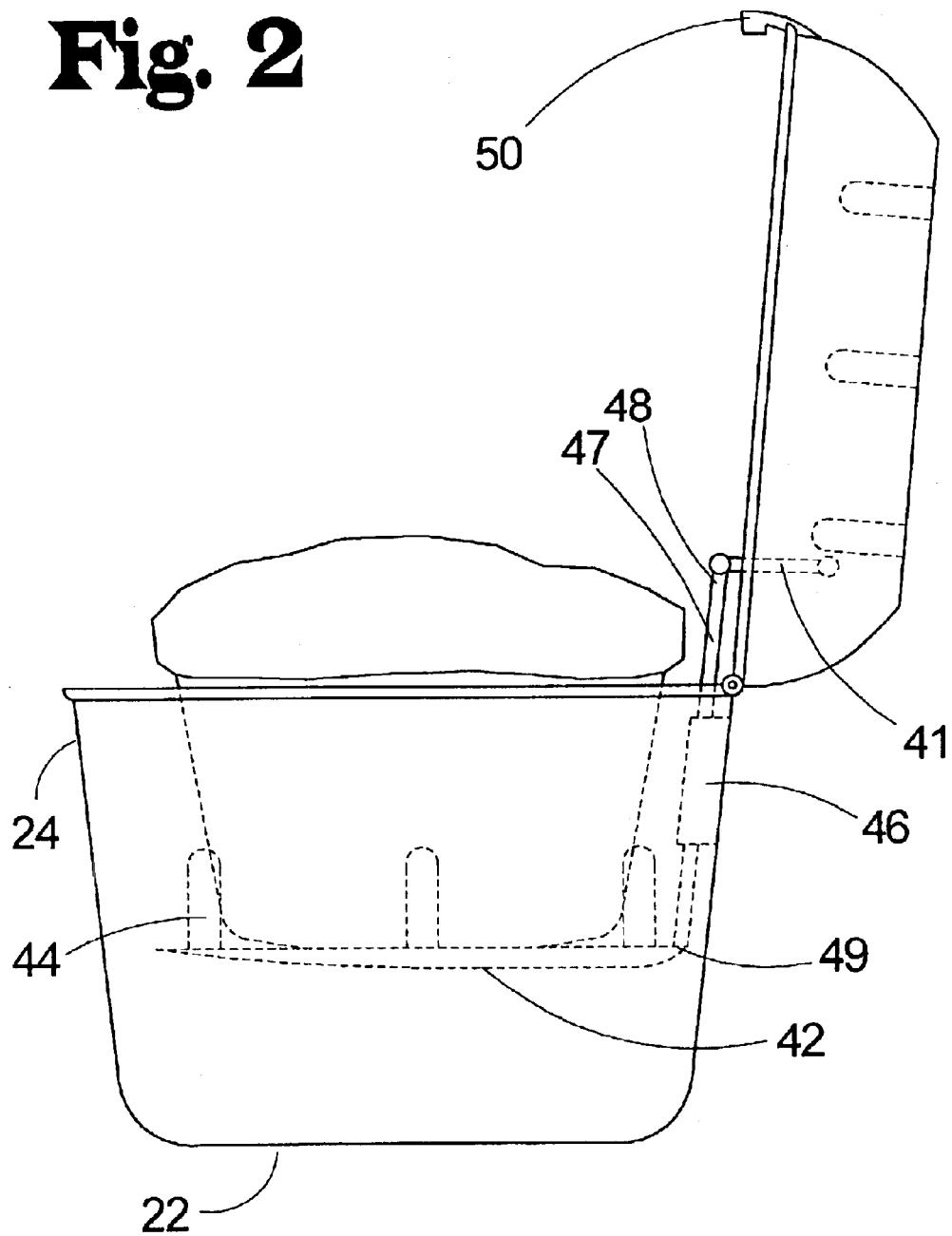
FIG. 2 is a schematic side view of the present invention.
Figure 3:
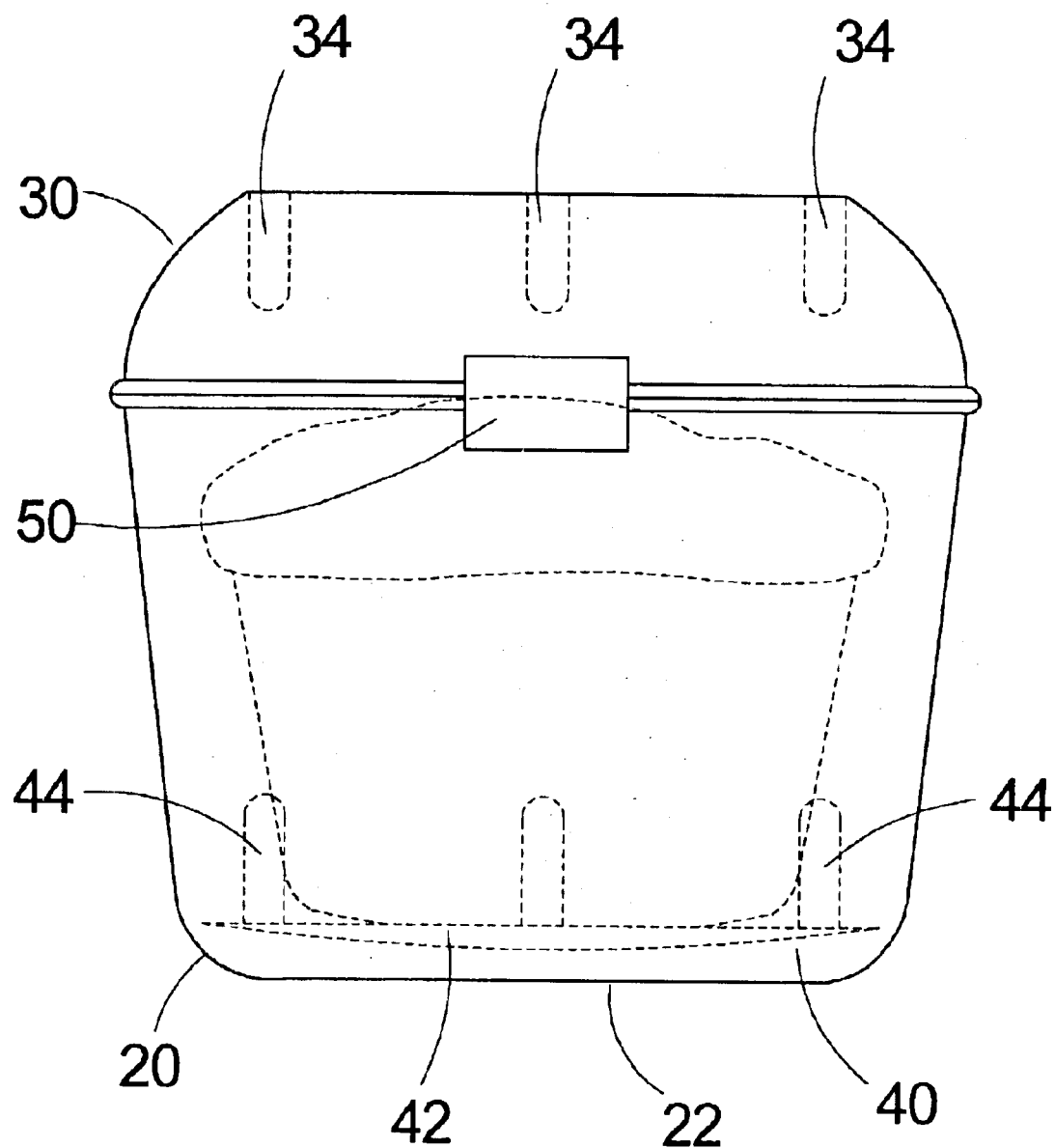
FIG. 3 is a schematic front view of the present invention.

With reference now to the drawings, and in particular to FIGS. 1 through 3 thereof, a new crush proof cupcake holder embodying the principles and concepts of the present invention and generally designated by the reference numeral 10 will be described.

As best illustrated in FIGS. 1 through 3, the crush proof cupcake holder 10 generally comprises a main container assembly 20, a lid assembly 30, and a pastry receiving tray assembly 40. The main container assembly 20 which includes a bottom wall 22 and a perimeter wall 24 extending upwardly from a perimeter edge 24 of the bottom wall 22. The main container assembly 20 defines an interior space. The main container assembly 20 is for selectively receiving a pastry.

The lid assembly 30 is preferably operationally couplable to the main container assembly 20. The lid assembly 30 is for selectively inhibiting access to the interior space. The lid assembly 30 may be selectively detachable form the main container 20 assembly to facilitate cleaning.

The pastry receiving tray assembly 40 is preferably positionable within the main container assembly 20. The pastry receiving tray assembly 40 includes a main member 42 for supporting a bottom of a pastry placed upon the pastry receiving tray assembly 40.

In an embodiment the main member 40 further comprises a plurality of pin members 44. Each one of the plurality of pin members 44 extends upwardly from the main member 42. The plurality of pin members 44 inhibits lateral motion of the pastry with respect to the main member 42. Preferably, four pin members are used, but three or more pin members may be used effectively.

In a further embodiment the pastry receiving tray assembly 40 further comprises a sleeve portion 46, a lifting rod member 47, and a lid attachment member 41. The sleeve portion 46 is preferably operationally coupled to the perimeter wall 24. The lifting rod member 47 is slideably receivable by the sleeve portion 46. The lifting rod member 47 includes a distal end 48 and a proximal end 49. The proximal end 49 being operationally couplable to the main member 20. The distal end 48 is operationally couplable to the lid assembly 30. Thus lifting the lid assembly 30 lifts the main member 42. The lid attachment member 41 is preferably pivotally coupled to the distal end 48 and to the lid assembly 30. Thus pivoting the lid assembly 30 with respect to the main container assembly 20 lifts the main member 42.

In still a further embodiment, the sleeve portion 46 is substantially hollow with the lifting rod member 47 being slideably received through the sleeve portion 46.

In yet a further embodiment the lid assembly 30 further comprises a domed lid 32 pivotally coupled to the main container assembly 20.

In even still a further embodiment the lid assembly 30 further comprises a plurality of pin members 34 extending downwardly from the domed lid 32. The plurality of pin members 34 inhibits vertical movement of the pastry when the lid assembly 30 is in a closed position. Thus frosting from the pastry does not stick to the domed lid 32. Most preferably, four pin members are used, however two or more pin members may be used.

In still yet a further embodiment a latching assembly 50 is used for selectively securing the lid assembly 30 to the main container assembly 20.

In an embodiment the main container assembly 20 includes an overall diameter of approximately 3¼ inches and an overall height of approximately 2½ inches.

In use, the user opens the system and placed the pastry on the main member. The user then closed the lid assembly with respect to the main container assembly and latches the lid to the main container.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pastry holding system comprising:

a main container assembly having a bottom wall and a perimeter wall extending upwardly from a perimeter edge of said bottom wall, said main container assembly defining an interior space, said main container assembly being for selectively receiving a pastry;

a lid assembly being operationally couplable to said main container assembly, said lid assembly being for selectively inhibiting access to said interior space;

a pastry receiving tray assembly positionable within said main container assembly, said pastry receiving tray assembly having a main member for supporting a bottom of a pastry placed upon said pastry receiving tray assembly;

wherein said pastry receiving tray assembly further comprises:

a sleeve portion operationally coupled to said perimeter wall; and a lifting rod member slideably receivable by said sleeve portion, said lifting rod member having a distal end and a proximal end, said proximal end being operationally couplable to said main member, said distal end being operationally couplable to said lid assembly whereby lifting said lid assembly lifts said main member.

2. The system of claim 1, wherein said main member further comprises a plurality of pin members extending upwardly from said main member, said plurality of pin members inhibiting lateral motion of the pastry with respect to the main member.

3. The system of claim 1, wherein said pastry receiving tray assembly further comprises a lid attachment member pivotally coupled to said distal end, said lid attachment member being coupled to said lid assembly whereby pivoting said lid assembly with respect to said main container assembly lifts said main member.

4. The system of claim 1, wherein said lid assembly further comprises a domed lid pivotally coupled to said main container assembly.

5. The system of claim 4, wherein said lid assembly further comprises a plurality of pin members extending downwardly from said domed lid, said plurality of pin members inhibiting vertical movement of said pastry when said lid assembly is in a closed position whereby frosting from the pastry does not stick to the domed lid.

6. A pastry holding system comprising:

a main container assembly having a bottom wall and a perimeter wall extending upwardly from a perimeter edge of said bottom wall, said main container assembly defining an interior space, said main container assembly being for selectively receiving a pastry;

a lid assembly being operationally couplable to said main container assembly, said lid assembly being for selectively inhibiting access to said interior space;

a pastry receiving tray assembly positionable within said main container assembly, said pastry receiving tray assembly having a main member for supporting a bottom of a pastry placed upon said pastry receiving tray assembly;

wherein said main member further comprises a plurality of pin members extending upwardly from said main member, said plurality of pin members inhibiting lateral motion of the pastry with respect to the main member;

wherein said pastry receiving tray assembly further comprises:

a sleeve portion operationally coupled to said perimeter wall;

a lifting rod member slideably receivable by said sleeve portion, said lifting rod member having a distal end and a proximal end, said proximal end being operationally couplable to said main member, said distal end being operationally couplable to said lid assembly whereby lifting said lid assembly lifts said main member;

a lid attachment member pivotally coupled to said distal end, said lid attachment member being coupled to said lid assembly whereby pivoting said lid assembly with respect to said main container assembly lifts said main member;

wherein said lid assembly further comprises a domed lid pivotally coupled to said main container assembly;

wherein said lid assembly further comprises a plurality of pin members extending downwardly from said domed lid, said plurality of pin members inhibiting vertical movement of said pastry when said lid assembly is in a closed position whereby frosting from the pastry does not stick to the domed lid.

7. The system of claim 6 further comprises a latching assembly for selectively securing said lid assembly to said main container assembly.

8. The system of claim 6, wherein said main container assembly having an overall diameter of approximately 3¼ inches.

9. The system of claim 6, wherein said main container assembly having an overall height of approximately 2½ inches.

* * * * *